(12) United States Patent
Chaar et al.

(10) Patent No.: US 9,076,343 B2
(45) Date of Patent: Jul. 7, 2015

(54) SELF-SERVICE SYSTEM FOR EDUCATION

(75) Inventors: Jarir K Chaar, Tarrytown, NY (US); Vincent J Cina, Jr., Chestnut Ridge, NY (US); Dimitri Kanevsky, Ossining, NY (US); Neal M Keller, Hawthorne, NY (US); Juhnyoung Lee, Yorktown Heights, NY (US); Clifford A Pickover, Yorktown Heights, NY (US); Edith H Stern, Yorktown Heights, NY (US); Alexander Zlatsin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 667 days.

(21) Appl. No.: 10/818,656

(22) Filed: Apr. 6, 2004

(65) Prior Publication Data
US 2005/0221268 A1 Oct. 6, 2005

(51) Int. Cl.
*G09B 3/00* (2006.01)
*G09B 7/02* (2006.01)

(52) U.S. Cl.
CPC ......................................... *G09B 7/02* (2013.01)

(58) Field of Classification Search
USPC ................................................ 434/350; 3/350
See application file for complete search history.

(56) References Cited

U.S. PATENT DOCUMENTS

| | | | | |
|---|---|---|---|---|
| 5,944,530 A * | 8/1999 | Ho et al. | | 434/236 |
| 6,402,520 B1 * | 6/2002 | Freer | | 434/236 |
| 2002/0077884 A1* | 6/2002 | Sketch | | 705/12 |
| 2002/0115050 A1* | 8/2002 | Roschelle et al. | | 434/350 |
| 2003/0044762 A1* | 3/2003 | Bergan et al. | | 434/350 |
| 2004/0002039 A1* | 1/2004 | Draper et al. | | 434/118 |
| 2004/0002040 A1* | 1/2004 | Foley et al. | | 434/118 |
| 2004/0014013 A1* | 1/2004 | Diesel et al. | | 434/118 |
| 2004/0096811 A1* | 5/2004 | Anneswamy et al. | | 434/365 |
| 2004/0110120 A1* | 6/2004 | Ho et al. | | 434/350 |

* cited by examiner

*Primary Examiner* — Kesha Frisby
(74) *Attorney, Agent, or Firm* — Thomas A. Beck; Daniel P. Morris

(57) ABSTRACT

An adaptive system enables providers to customize educational objects and support services to maximize user engagement. The system is a self-service system for education for providers that includes a learning environment with interfaces for stakeholders, metrics for measuring the level of user engagement, and a customizable service configured to maximize user engagement. The system may operate in many domains, such as higher education, retail, government, test preparation and certification services, negotiations, and others.

63 Claims, 20 Drawing Sheets

Sponsor Name _____

SLA Target _____   Current SLA Perf. _____

___ poor  ___ on target  ___ exceeding

1400

| User Group | Aggregated SLA | SLA Range | SLA Exceptions | Projected Cost | Overall Network Performance | Overall Service Availability | Overall privacy or Intrusiveness Rejections | Provider(s) |
|---|---|---|---|---|---|---|---|---|
| | | | | | | | | |
| | | | | | | | | |
| | | | | | | | | |
| | | | | | | | | |

Provider Name _____
Sponsor Name _____

← 1402

| User | User Group | Requested Objects | Provided Objects | Unavailable Objects | Reason | Requested Services | Provided Services | Unavailable Services | Reason |
|------|------------|-------------------|------------------|---------------------|--------|--------------------|--------------------|----------------------|--------|
|      |            |                   |                  |                     |        |                    |                    |                      |        |
|      |            |                   |                  |                     |        |                    |                    |                      |        |
|      |            |                   |                  |                     |        |                    |                    |                      |        |
|      |            |                   |                  |                     |        |                    |                    |                      |        |

Fig. 16

Sponsor Name _____   SLA Target _____   Current SLA Perf. _____   ___ poor ___ on target ___ exceeding

1404

| Provider | User Groups | Objects/ Services | Cost | Network Performance | Service Availability | Privacy or Intrusiveness Rejections |
|---|---|---|---|---|---|---|
| 1700 | 1702 | 1704 | 1706 | 1708 | 1710 | 1712 |
|  |  |  |  |  |  |  |
|  |  |  |  |  |  |  |
|  |  |  |  |  |  |  |
|  |  |  |  |  |  |  |

Fig. 17

Meta-Provider Name _____                    Sponsor Name _____

| User | User Group | Requested Objects, Services or Changes | Pending | Completed | Unfulfilled | Rejected by User | Reason |
|------|------------|----------------------------------------|---------|-----------|-------------|------------------|--------|
|      |            |                                        |         |           |             |                  |        |
|      |            |                                        |         |           |             |                  |        |
|      |            |                                        |         |           |             |                  |        |
|      |            |                                        |         |           |             |                  |        |

Fig. 19

| User Group | Object/Services Provided | Cost | Network Performance | Service Availability | Privacy or Intrusiveness Rejections | | |
|---|---|---|---|---|---|---|---|
| | | | | | | | |
| | | | | | | | |
| | | | | | | | |
| | | | | | | | |

Meta-Provider Name _____

Sponsor Name _____

Fig. 20

SELF-SERVICE SYSTEM FOR EDUCATION

BACKGROUND OF THE INVENTION

1. Field of the Invention

This invention relates generally to the field of education and to providing customized support services to learners and presenters. More specifically, the invention relates to the use of biometric, non-biometric and system data to inform the selection and execution of support services which maximize user engagement metrics and to enabling providers to negotiate service level agreements based on these metrics. This invention is applicable to many fields, including the fields of education, distance learning, teacher coaching and certification, on the job training, test preparation and certification, collaboration, e-government, accessibility, negotiations and trading.

2. Description of Related Art

Providers of educational and collaborative infrastructures and services to higher education institutions, retail chains, governments, and other organizations are experiencing increased customer expectations and the entry of new competitors, thus leading to increased customer choices. There is a need to meet these challenges in the higher education domain, the retail domain, the government domain, the test preparation and certification services domain, and the negotiations domain.

In the higher education domain, financial pressures fueled by declines in government support along with continuing tuition increases and declining endowments, along with greater demands for student performance, have led to an increased focus on operational effectiveness and efficiency. One consequence of these pressures is a change in the criteria used to select private technology partners, with preference being given to those providers who can best help higher education institutions lower their cost structures by enabling a more flexible and responsive IT infrastructure. Higher education is experiencing new competitors and players, leading to more student choice. Changes in the demographics of learners and their need for support services have positioned a college's learner support services as a strategic competitive advantage rather than an expense. Current systems for coaching weak instructors and for providing customized instructor and learner support services are labor intensive, costly, and often not implemented rapidly enough for maximum effectiveness.

In the retail domain, competitive pressures are driving such innovations as self-checkout and experiments in cost effectively providing customized e-learning "on the fly" to relatively low paid sales associates concerning the features and benefits of new products while at the same time improving their job satisfaction and reducing high turnover. The trend towards the on demand dynamic reallocation of retail shelf space to enable the increased use of dynamic promotions increases the need to provide retail sales associates with on-demand training. Current systems for sales associate training are not customized for their individual's learning needs and rely on centrally located classroom or computer based training facilities or large fixed kiosks.

In the government domain, budgetary pressures combined with increased citizen expectations for customer centric transactions and competition between municipalities, states, and countries to attract businesses which will employ citizens and pay taxes are driving e-government initiatives in which technology is a significant enabler. Current e-government initiatives are generally confined to access to information portals and one way messaging, with the goal of facilitating on-demand cross-agency collaboration dependent on transformations in business models, infrastructure and culture. An important aspect of infrastructure transformation involves the integration of private sector partners to support two way citizen centric collaboration infrastructures for multiple purposes including virtual town hall meetings and the delivery of customized support services from multiple agencies while respecting citizen privacy.

In the test preparation and certification services domain, competitive pressures are forcing meta-providers to offer a money back guarantee or an option to repeat the course without additional charge, regardless of whether the learning is delivered in individual or group contexts, in physical or virtual classrooms or self study, and whether the learning is delivered by live teachers, software programs, or some combination thereof. Providers and meta-providers of test preparation and certification services are faced with the necessity of pricing their offerings competitively, along with the above mentioned guarantees, while needing to accommodate situations where customers expect the providers and/or meta-providers to incur extra expenses to insure success in passing the relevant test.

In the negotiations domain, rapidly changing market conditions and shortened product lifecycles have increased the pressure to successfully conclude negotiations with customers, partners and suppliers by quickly building rapport. Techniques for using non-verbal communication to keep negotiations focused on solutions rather than demands are well known in the negotiations field. Current negotiations simulators, however, are generally directed to providing coaching in the correct cognitive responses to specific offers but do not provide feedback on the effectiveness of non-verbal communications in maintaining rapport.

One important aspect of providing effective learner or citizen centric services is maintaining a high level of user engagement with the task. Currently there are previously disclosed techniques for separately or in combination monitoring and evaluating biometric, non-biometric and user device data for purposes such as user identification and the assessment of user alertness, mood, and efficiency in achieving a goal. Suggested interventions, based on the variety of metrics generated from the monitoring, include keeping users awake and suggesting various courses of action, such as a more efficient task procedure for users to follow or modifying the content and pace of a teacher's lesson.

Other previously disclosed techniques seek to recognize the affective and emotional state of the learner and respond in an appropriate manner, modeling an expert teacher or collaborator, to keep exploration going in model based subject areas, such as science, math, engineering or technology.

While such systems address various aspects of user task performance and mood, and suggest various interventions, what is needed is a comprehensive end-to-end system, which enables providers to integrate previously disclosed monitoring and intervention techniques with previously disclosed information technology infrastructures, electronic learning environments, and electronic marketplace infrastructures to deliver on-demand services based on service level agreements with stakeholders in a variety of domains that involve learning and collaboration.

BRIEF SUMMARY OF THE INVENTION

The present invention has many aspects and is directed to an adaptive system to enable providers to customize educational objects and support service to maximize user engagement that fulfills the above needs and more.

One aspect is a self-service system for education for providers, which comprises: a learning environment and at least one metric. The learning environment has a plurality of interfaces for a plurality of stakeholders. The metric is for measuring a level of user engagement with the learning environment. A provider offers a customizable service configured to maximize the user engagement with the learning environment, using the metric.

In some embodiments, the stakeholders are as follows: a user, a provider, a meta-provider, a sponsor, or any combination thereof. In some embodiments, the user is as follows: a student, a teacher, a group of students, a group of teachers, an individual employee, a department, a company, a citizen, a geopolitical group, or any combination thereof. In some embodiments, the provider offers the customizable service directly to the user. In some embodiments, the provider offer the customizable service to a meta-provider. In some embodiments, the meta-provider aggregates the customizable service of at least one provider for delivery to at least one user. In some embodiments, the customizable service is as follows: a playback of a live presentation, a computer-based training program, an animation, a simulation, a game, a language translator, or any combination thereof. In some embodiments, the sponsor authorizes delivery of at least one educational object or at least one support service and changes by a provider, on behalf of at least one user. The sponsor is as follows: a corporate buyer, a university, a governmental entity, or any combination thereof. In some embodiments, the stakeholders are physically co-located. In some embodiments, the stakeholders are accessible via at least one network-based technology. In some embodiments, the network-based technology is as follows: web conferencing, video conferencing, teleconferencing, text chat, or a virtual collaboration technology. In some embodiments, the interfaces include at least one interface for providing at least one educational object to the user. In some embodiments, the education object is configurable to maximize the user engagement. In some embodiments, the configuration is performed consistent with user privacy preferences. In some embodiments, the interfaces include at least one interface for providing at least one support service to the user. In some embodiments, the support service is configurable to maximize the user engagement. In some embodiments, the configuration is performed consistent with user privacy preferences. In some embodiments, the metric is based on data that is biometric, non-biometric, device, distraction, or focus. In some embodiments, the data is collected consistent with user privacy preferences. In some embodiments, the metric is measured for a category that is: a group of users in a specific course, a department, a job classification, a specific providers, a meta-provider, or any combination thereof. In some embodiments, the system also includes at least one service level agreement between any combination of stakeholders, where the service level agreement is based on the metric. In some embodiments, the system also includes a plurality of electronic connections between information technology infrastructures of any combination of the stakeholders and an online marketplace to facilitate negotiations for the service level agreement. In some embodiments, the electronic connections between information technology infrastructures of any combinations of stakeholders enables the user access to the learning environment of a sponsor. In some embodiments, the user access is provided by a mechanism, such as the sponsor's intranet, the sponsor's portal, or the user's electronic workplace. In some embodiments, the service level agreement results from negotiations based on at least one auction. In some embodiments, the auction is conducted in whole or in part by at least one software agent. In some embodiments, the system also includes a delivery platform having a portal through which different workspaces and user interfaces of the self service system can be displayed and operated on one or more user and provider devices. In some embodiments, the user and provider devices are as follows: a PDA, a cellular phone, a tablet computer, a laptop computer, a desktop computer, or a workstation. In some embodiments, the portal provides a consistent and coherent user experience.

Another aspect is a method for providing a self-service system for education. A learning environment is provided that has a plurality of interfaces for a plurality of stakeholders. At least one metric that indicates a level of user engagement with the learning environment is measured. The provider is enabled to offer a customizable service configured to maximize the user engagement with the learning environment, using the metric.

In some embodiments, the learning environment is monitored and any changes in status data associated with the learning environment are collected. In some embodiments, the learning environment includes at least one of the following items: a user, an educational object, a support service, an individual, an aggregated user engagement metric, a performance against a service level agreement, a cost incurred, a charge assessed by a stakeholder, a charge against the stakeholders, and any combination thereof. In some embodiments, there is a plurality of items and at least one relationship is provided between at least two of the items for stakeholder analysis and decision making. In some embodiments, a change to the educational object for a group of users who share a learning environment is recommended. In some embodiments, the educational object is as follows: a text, a multimedia presentation, a training session, a training manual, an audio clip, a video clip, a web site, a corporate web site, a government web site, a course, a qualification course, a course in a degree program, or any combination thereof. In some embodiments, the change to the educational object is as follows: a volume, a color, a contrast, a tone, a voice, a teaching style, a subject matter, a quiz, a question, a work flow, a pace, an educational complexity, an educational sophistication, a level of detail, a level of animation, an insertion of a break, a sensory stimulant, or any combination thereof. In some embodiments, the sensory stimulant is as follows: a joke, a scream, a burst of air, a mouse vibration, a keyboard vibration, an aroma, a music selection, a timbre, an amount of bass, an amount of treble, a blinking, a gender of a live teacher, an ethnicity of a live teacher, a vocal accent of a live teacher, an appearance of a live teacher, a gender of a simulated teacher, an ethnicity of a simulated teacher, a vocal accent of a simulated teacher, an appearance of a simulated teacher, or any combination thereof. In some embodiments, a change to the support service for a group of users who share a learning environment is recommended. In some embodiments, the support service is as follows: an information transmission, a text summarization, a language translation, a technical glossary, a capture and replay of live presentations, or any combination thereof. In some embodiments, the change to the support service is as follows: adding one of the support services, removing one of the support services, modifying one of the support services, changing a start of one of the support services, changing a stop time of one of the support services, changing an intensity of one of the support services, changing a duration of one of the support services, or any combination thereof. In some embodiments, teacher performance ratings are based in whole or in part on performance against at least one service level agreement. In some embodiments, teacher compensation is based in whole or in part on performance against at least one service level agreement. In some embodiments, the metric is based on data selected one of the following: biometric data, non-biometric data, device data, distraction data, or focus data. In some embodiments, the biometric data includes behavior, speech and gestures. In some embodiments, the biometric data is as follows: heart rate, breathing rate, body temperature, brain waves, blood pressure, blood composition, disease state, pupil dilation amount, iris size, eye gaze and focus, eye movements, voice quality assessment in a speech recognition system, facial expression, degree of movement, repetition of movement, an indicator of arousal, an indicator of emotion, a shift in body position, a fidgeting movement, or any combination thereof. In some embodiments, the non-biometric data is as follows: degree of multitasking, efficiency of task performance, number of non-learning task related windows open, changes in grammar, spelling proficiency, or any combination thereof. In some embodiments, the device data is as follows: processor speed, memory capacity, system load status, network bandwidth, network transmission speed, overall response time of tools for a user, or any combination thereof. In some embodiments, the focus data is as follows: a time spent on a web page related to a presentation, a cursor movement on a presentation, a selection of an input on a presentation, a scroll time on a presentation, or any combination thereof. In some embodiments, the distraction data is as follows: a time on a web page that is not related to a presentation, an exchange of email with another student, an instant message with another student, a gaze out a window, a decreased typing speed, a lack of mouse motion, talking on a phone, talking to another, an incorrect response, a slow response, an inappropriate response, or any combination thereof.

Another aspect is a computer readable medium, such as a compact disk (CD) having executable instructions stored thereon to perform a method of providing a self-service system for education. A learning environment having a plurality of interfaces for a plurality of stakeholders is provided. At least one metric that indicates a level of user engagement with the learning environment is measured. A provider is enabled to offer a customizable service configured to maximize the user engagement with the learning environment, using the metric.

In some embodiments, one of the interfaces receives a selection of the metric from the following categories: biometric, non-biometric, user device, focus and/or distraction data to be used in determining the metric. The interfaces receive a relative importance of each selected category. In some embodiments, an organization restricts a user's choices of categories of providers and/or meta-providers, specific providers and meta-providers. In some embodiments, this restricting is performed regardless of the provider. In some embodiments, this restricting is performed based on one of the following criteria: cost, privacy, intrusiveness, or any combination thereof. In some embodiments, an organization restricts educational object and/or support service choices and changes. In some embodiments, this restricting is performed regardless of the provider. In some embodiments, this restricting is performed based on one of the following criteria: cost, privacy, intrusiveness, or any combination thereof. In some embodiments, the learning environment has one of the following domains: learning, training, education, teacher preparation, teacher certification, teacher presentation skills coaching, or any combination thereof. In some embodiments, the learning environment is in a form of collaboration with at least one colleague. In some embodiments, a purpose of the collaboration is one of the following: learning, business strategy, business tactics, business use, personal use, negotiation, trading, or any combination thereof.

BRIEF DESCRIPTION OF THE DRAWINGS

These and other features, aspects, and advantages of the present disclosure will become better understood with reference to the following description, appended claims, and drawings where:

FIG. 15 is a diagram illustrating a meta-provider interface to monitor performance against a service level agreement (SLA);

FIG. 16 is a diagram illustrating a meta-provider interface to notify providers regarding needed objects and services;

FIG. 17 is a diagram illustrating a meta-provider interface summarizing provider performance;

FIG. 19 is a diagram illustrating a provider interface to receive requests regarding needed objects and services; and FIG. 20 is a diagram illustrating a provider interface to monitor performance.

DETAILED DESCRIPTION OF THE INVENTION

Figure 1:
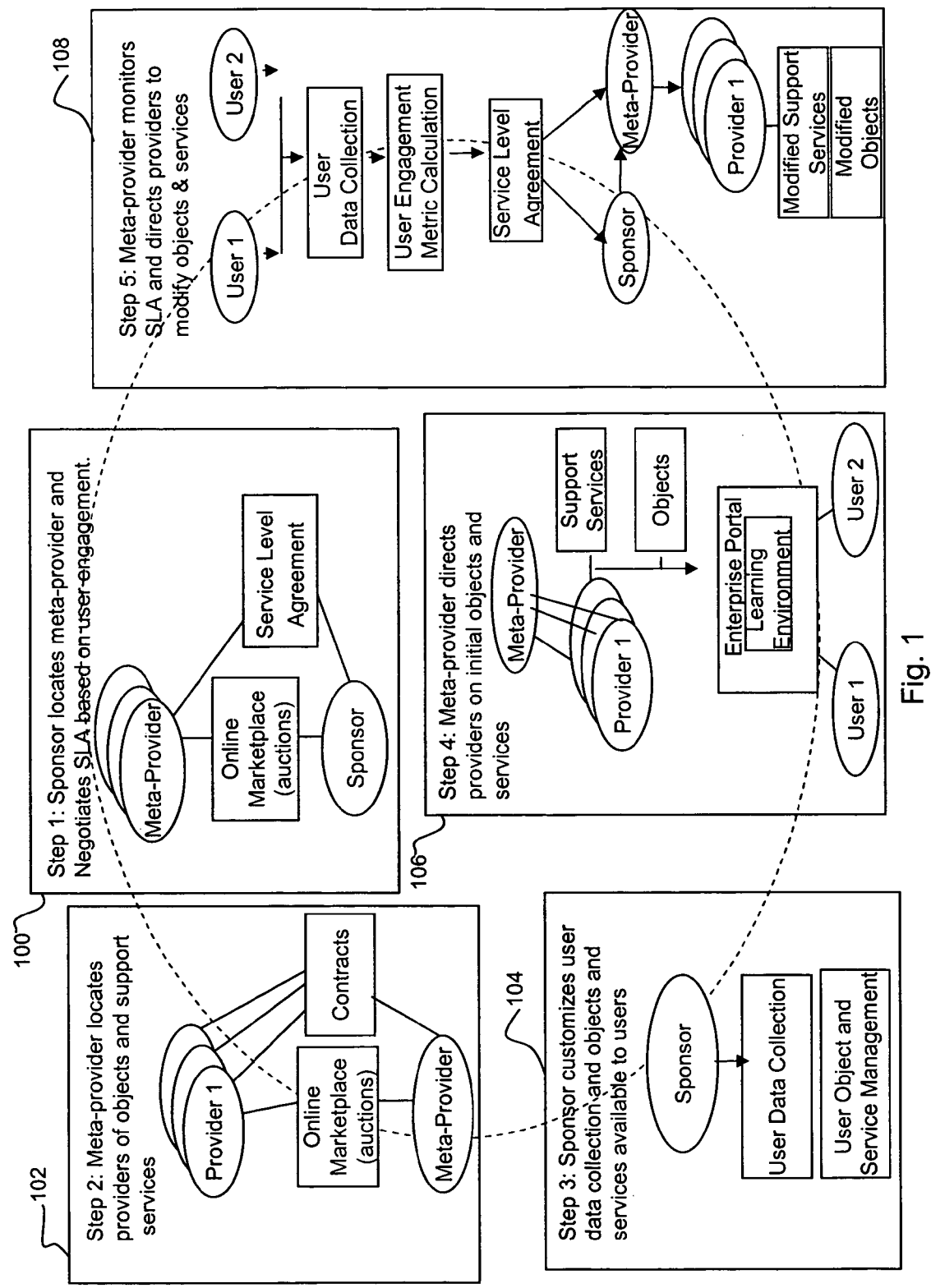
FIG. 1 is a flowchart showing an example architecture and conceptual flow of an example system, including major technology infrastructures and stakeholders.

FIG. 1 show an example architecture and conceptual flow of an example system, including major technology infrastructures and stakeholders. The example system is a comprehensive end-to-end system that enables meta-providers and providers to integrate monitoring and intervention techniques with information technology infrastructures, electronic learning environments, and electronic marketplace infrastructures to deliver on-demand services based on service level agreements with stakeholders in a variety of domains which involve learning and collaboration.

In the first activity 100, a sponsor identifies the need for user engagement metric driven objects and services to support learning or collaboration in one of the domains covered by the invention and uses an online marketplace, including auctions, to locate a meta-provider with whom they negotiate a service level agreement (SLA) based on aggregate user engagement metrics for a subject population of users.

In the second activity 102, the selected meta-provider identifies the needed objects and services and uses an online marketplace, including auctions, to locate one or more providers for these objects and services. The meta-provider negotiates a contract with each provider which covers many terms, including target costs, availability, network performance, and the degree to which objects or services proposed by the providers can be rejected by users.

In the third activity 104, the sponsor may exercise an option of specifying the types of data to be collected on users, consistent with user permission, and any restrictions on the types of objects or services that providers, as directed by the meta-provider, can make available to users.

In the fourth activity 106, the users begin the learning or collaboration activity in one of the domains covered by the present invention after the meta-provider directs the provider(s) to supply the starting set of objects and services designed to achieve the user engagement metrics specified in the service level agreement between the meta-provider and the sponsor.

In the fifth activity 108, the user data is collected, the user engagement metrics are calculated and made visible to the sponsor and meta-provider, compared with the service level agreement, and the system recommends to the meta-provider changes to the objects and services being provided so as to improve or maintain user engagement. The meta-provider directs the provider(s) to supply these modified objects and services and monitoring and modification cycle continues until the conclusion of the learning or collaboration activity.

Figure 2:
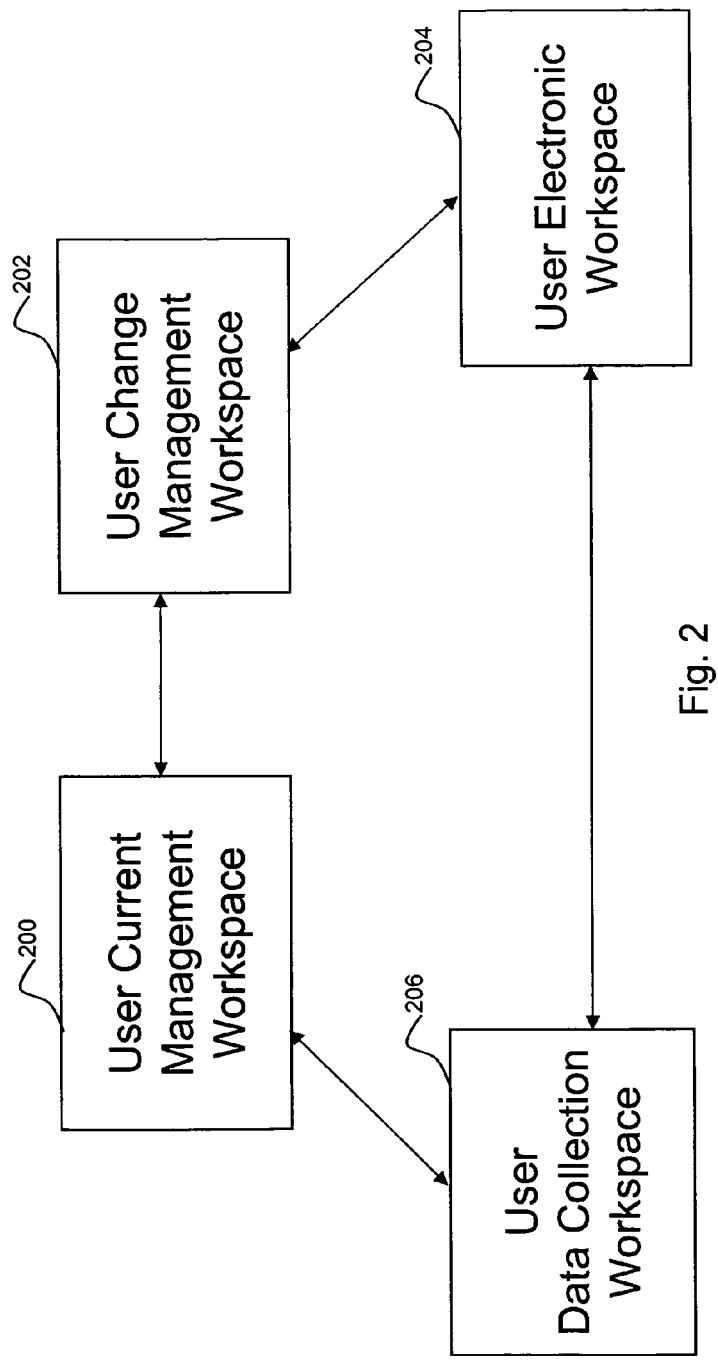
FIG. 2 is a flowchart showing example interfaces for a user's interaction with an example system through various graphical interfaces.

FIG. 2 shows example interfaces for a user's interaction with an example system through various graphical interfaces. In this example, there is a user current management workspace 200, a user change management workspace 202, a user electronic workspace 204, and a user data collection workspace 206.

Figure 3:
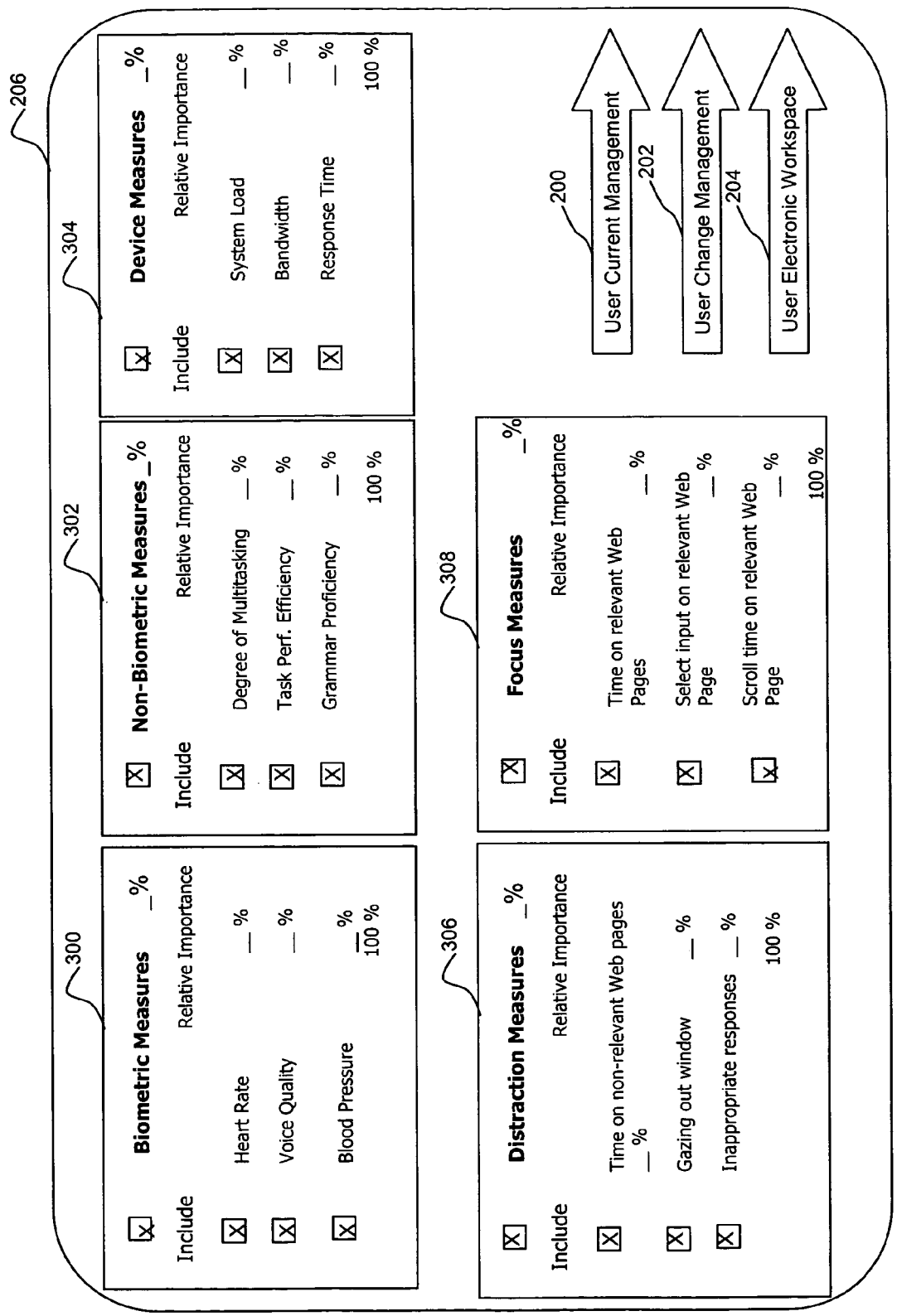
FIG. 3 is a diagram illustrating an example iconic graphical user interface for a user data collection workspace.

FIG. 3 illustrates an example iconic graphical user interface for a user data collection workspace 206. In this example, there are selection areas for biometric measures 300, non-biometric measures 302, device measures 304, distraction measures 306, and focus measures 308. Also, access is provided to the user current management workspace 200, the user change management workspace 202, and the user electronic workspace 204. In this workspace the user selects the specific biometric, non-biometric, device, focus and distraction measures that will be collected, as well as their relative importance, to enable the system to determine user engagement metrics during the user's interaction with the system.

Figure 4:
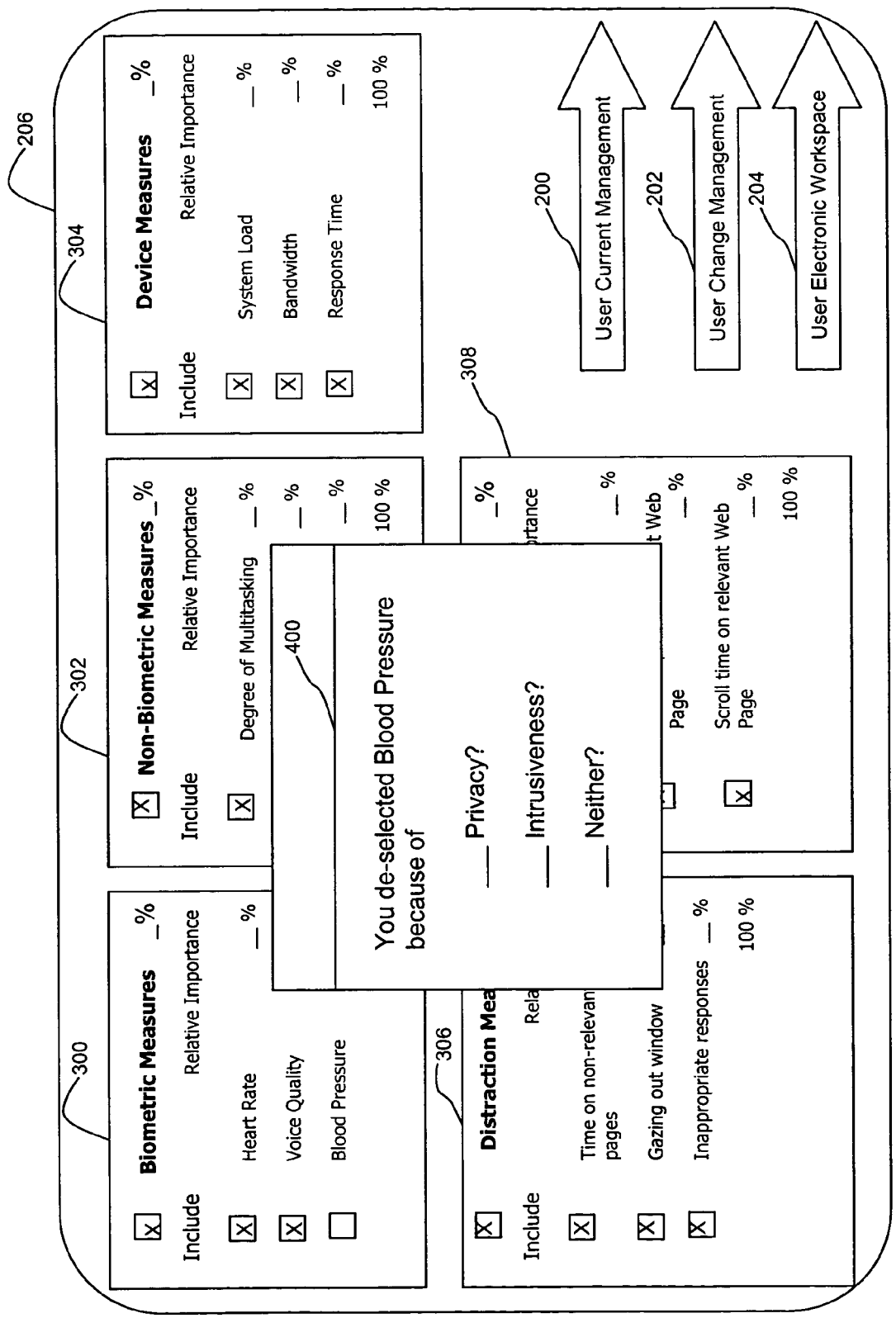
FIG. 4 is a diagram illustrating an example iconic graphical user interface for a user data collection workspace showing a query-by-system feature regarding a user's reason for deselection of a biometric measure.

FIG. 4 illustrates an example iconic graphical user interface for a user data collection workspace showing a query-by-system feature 400 regarding a user's reason for deselection of a biometric measure. In future uses of the example system by this user, data measures refused by the user will be eliminated from the defaults proposed. If the reason given by the user in response to query-by-system feature 400 indicates privacy, this data measure will be eliminated from the defaults for this user when they are in a shared environment with other users.

Figure 5:
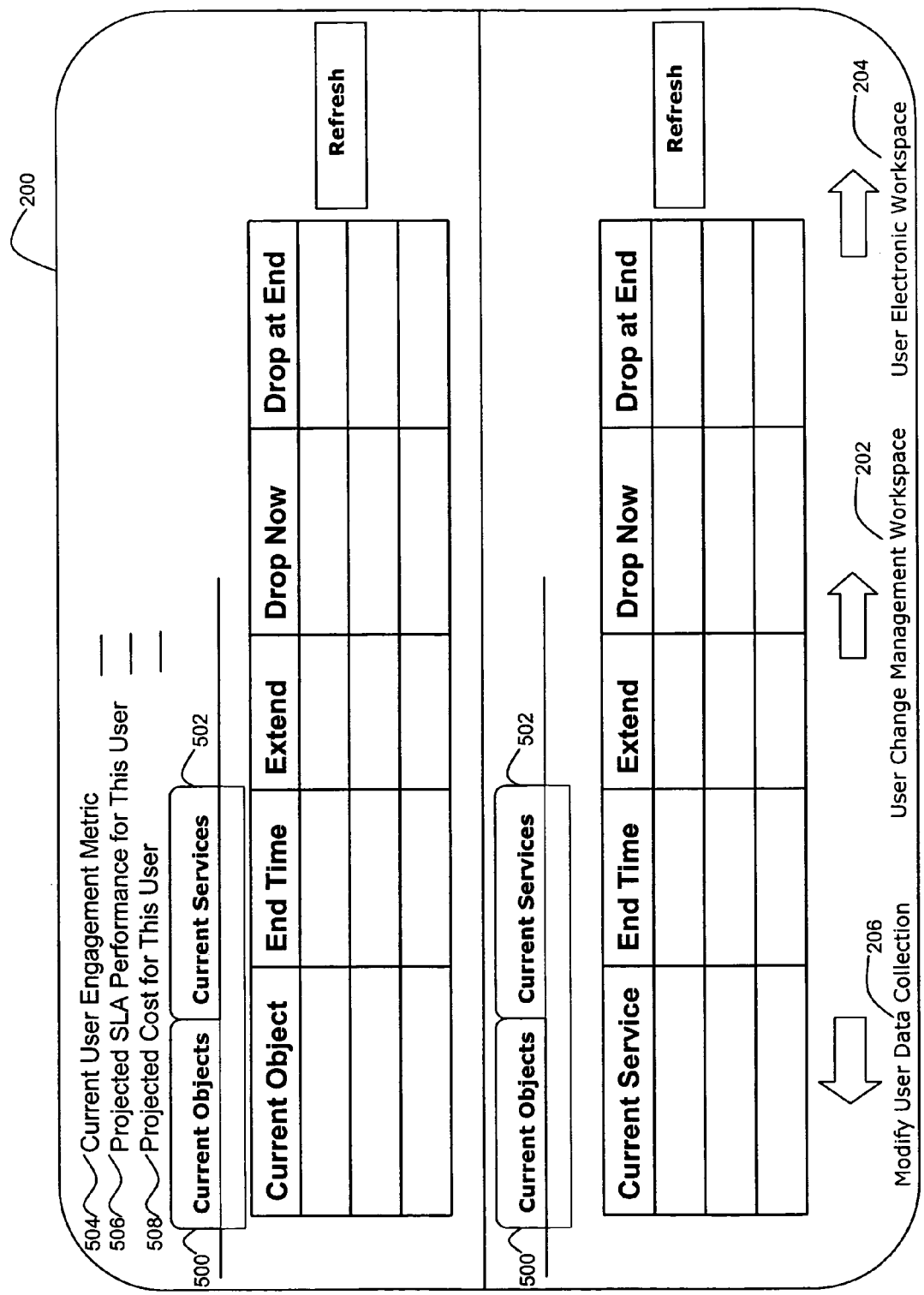
FIG. 5 is a diagram illustrating an iconic graphical user interface for a user current management workspace.

FIG. 5 illustrates an iconic graphical user interface for the user current management workspace 200. The user current management workspace 200 summarizes for the user the current objects 500 and services 502 which have been recommended and selected to help maintain user engagement. On the user current management workspace 200, the user sees how their current user engagement metric 504 compares with that projected 506 as part of the sponsor's service level agreement (SLA) with meta-providers, and the projected cost 508 of the current objects and services used by this user. On the user current management workspace 200, the user can elect to extend the duration of or discontinue the use of provided objects and services. Also, access is provided to the user change management workspace 202, the user electronic workspace 204, and the user data collection workspace 206.

Figure 6:
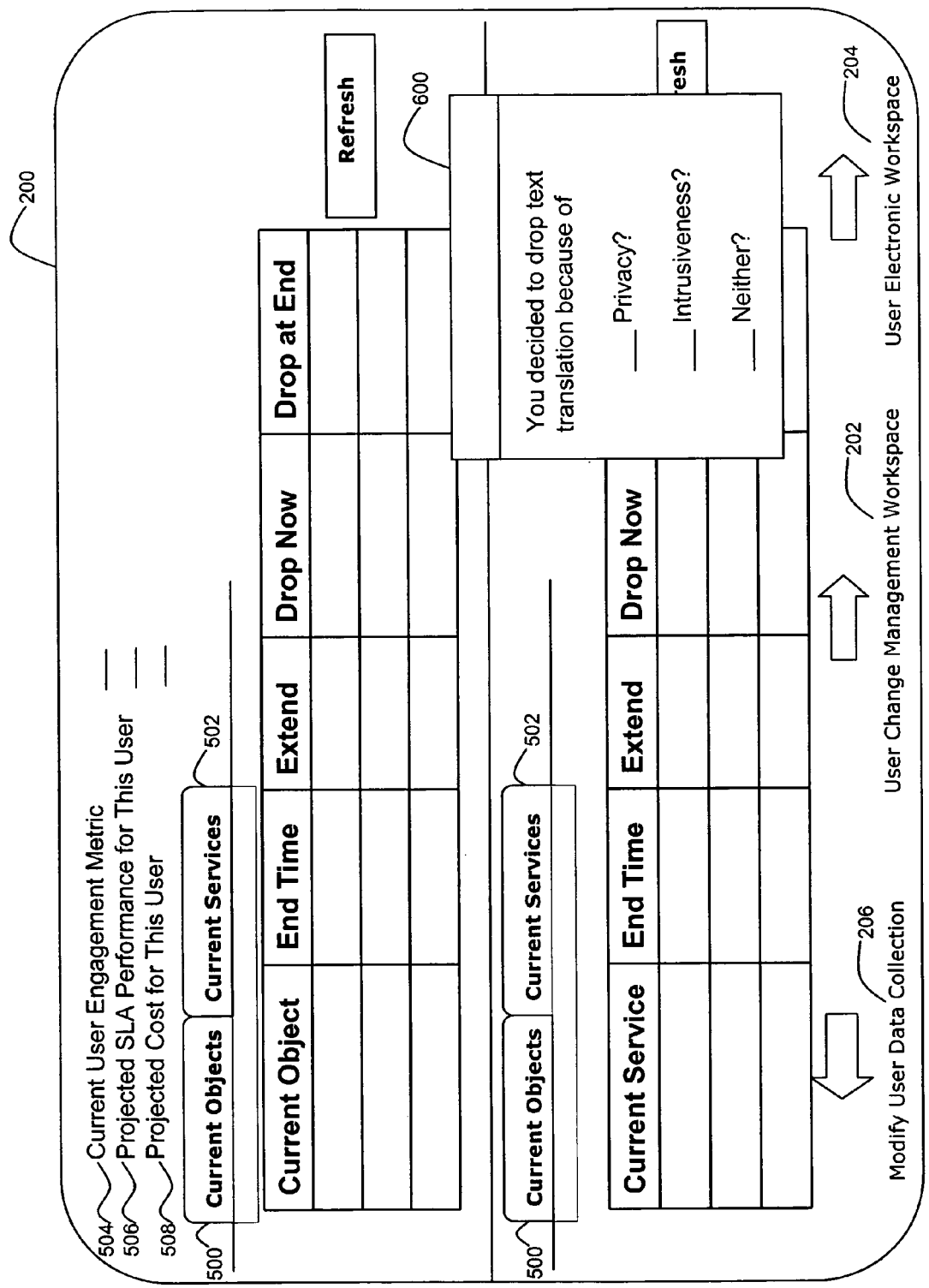
FIG. 6 is a diagram illustrating an iconic graphical user interface for a user current management workspace that shows a query-by-system feature regarding a user's reason for dropping a current service.

FIG. 6 illustrates an iconic graphical user interface for the user current management workspace 200 that shows a query-by-system feature 600 regarding a user's reason for dropping a current service. In future uses of the system by this user, the dropped objects and services will be eliminated from the defaults proposed. If the reason given by the user in response to the query-by-system feature 600 on FIG. 6 indicates privacy, this object or service will be eliminated from the defaults for this user when they are in a shared environment with other users.

Figure 7:
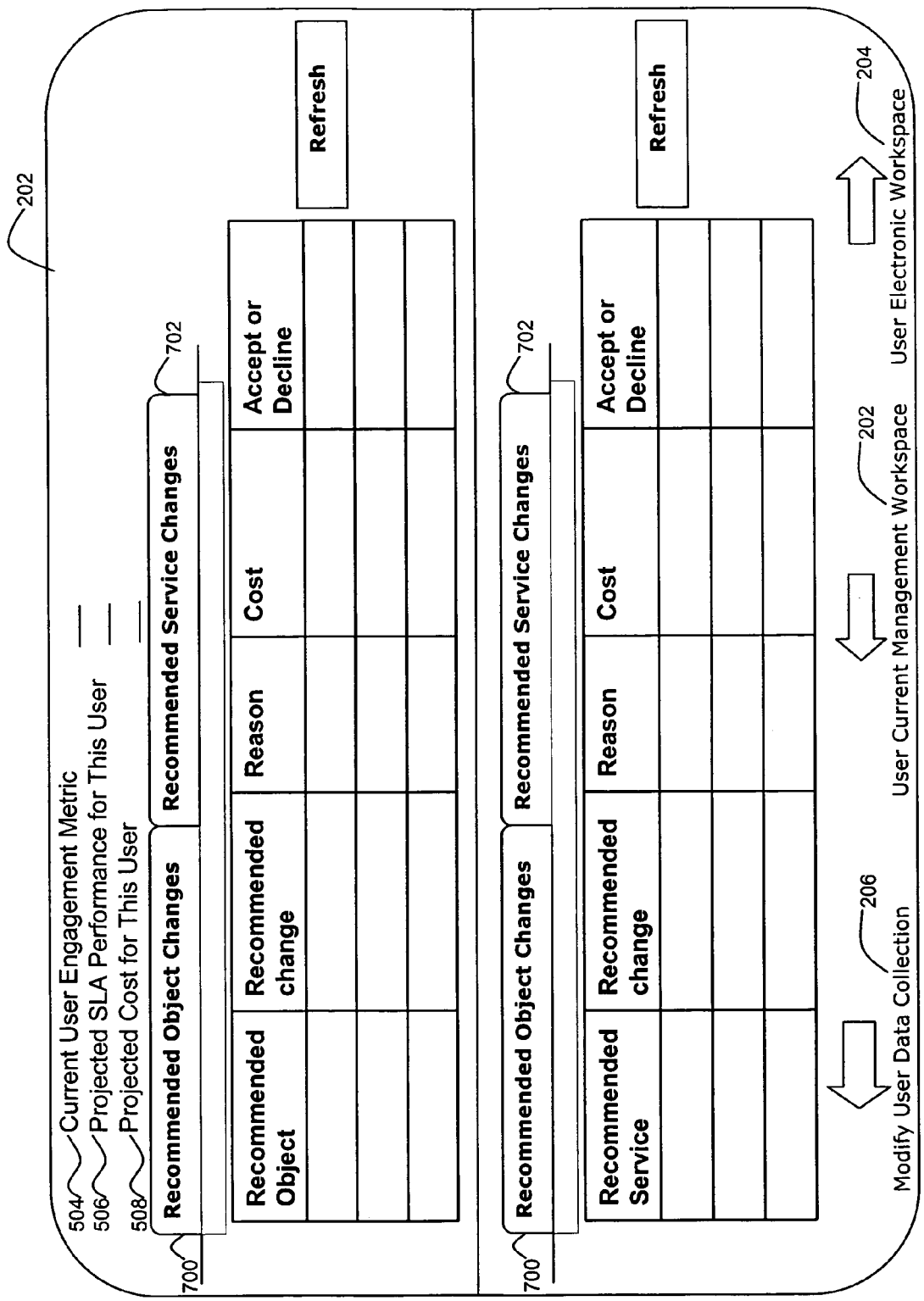
FIG. 7 is a diagram illustrating an iconic graphical user interface for a user change management workspace.

FIG. 7 illustrates an iconic graphical user interface for the user change management workspace 202. The user change management workspace 202 summarizes for the user the recommended objects and service changes 700, 702 that the system is proposing to improve or maintain the current user engagement metric. The user is provided with a reason for the recommended change (example: decreased task performance efficiency from the data collected on the user data collection workspace 206 has lowered the user engagement metric below that noted in the service level agreement (SLA)) and given the opportunity to accept or decline the recommended change with the knowledge of the cost to the user or sponsor.

Figure 8:
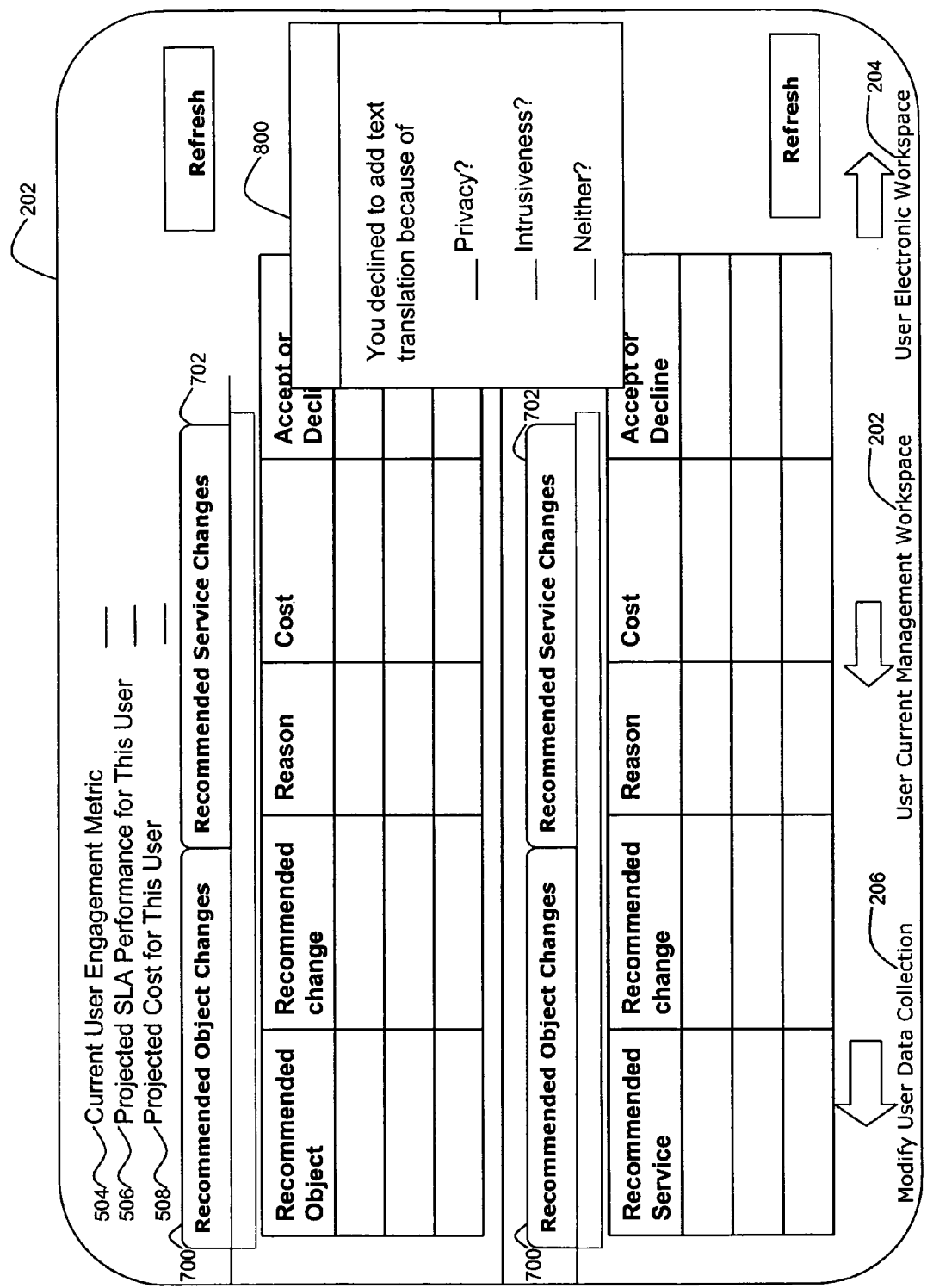
FIG. 8 is a diagram illustrating an iconic graphical user interface for a user change management workspace, showing a query-by-system feature regarding a user's reason for declining to add a recommended service.

FIG. 8 illustrates an iconic graphical user interface for the user change management workspace 202, showing a query-by-system feature 800 regarding a user's reason for declining to add a recommended service. In future uses of the system by this user, the rejected change will not be recommended. If the reason given by the user in response to the query-by-system feature 800 indicates privacy, this change in objects or services will not be recommended for this user when they are in a shared environment with other users. The extent to which current objects or services, or recommended objects or services, are dropped or rejected by users is one measure by which a sponsor may evaluate the effectiveness of a meta-provider in meeting their service level agreement regarding user engagement metrics.

Figure 9:
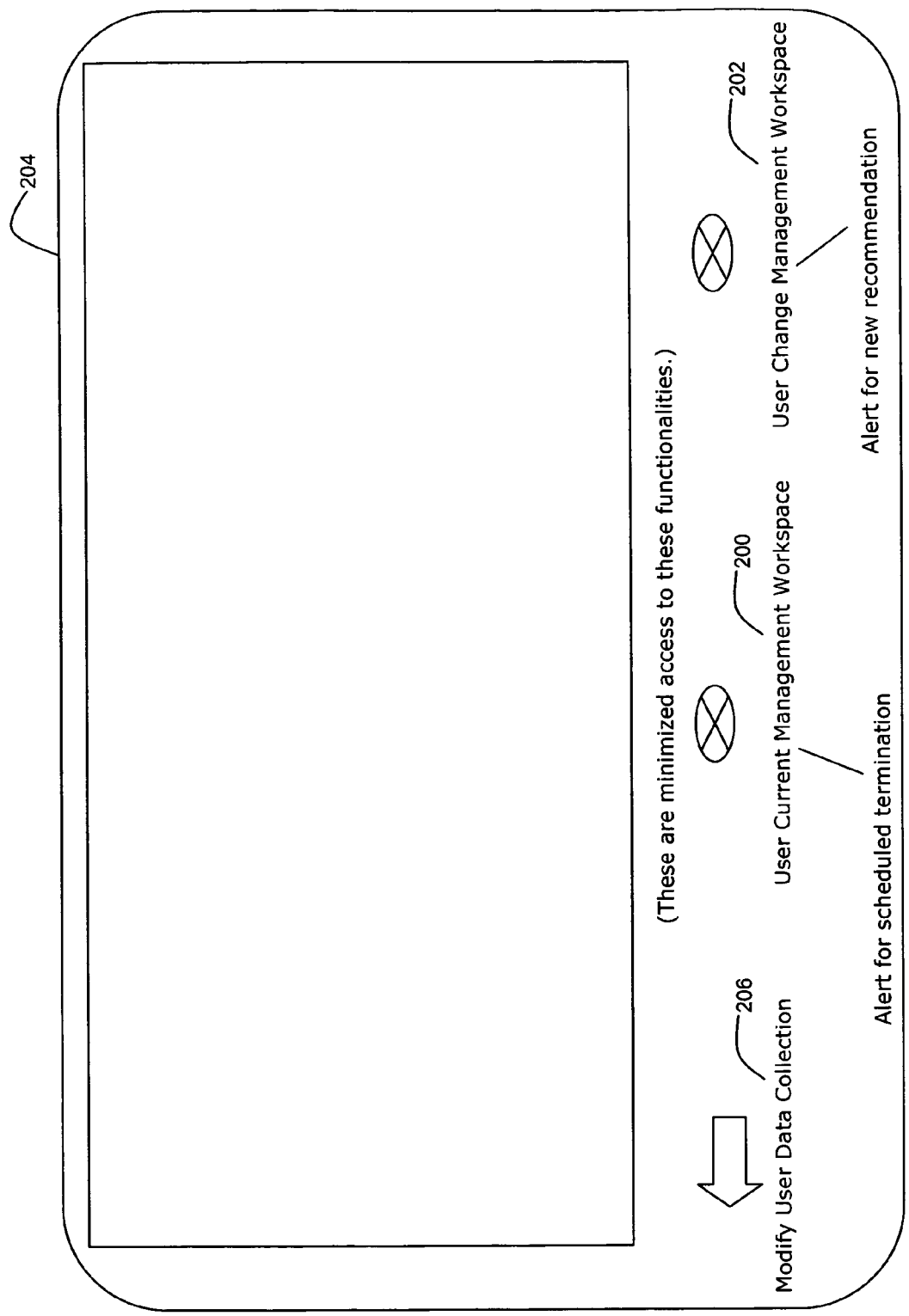
FIG. 9 is a block diagram illustrating an iconic graphical user interface for a user electronic workspace.

FIG. 9 illustrates an iconic graphical user interface for the user electronic workspace 204. This is where the user interacts with the domain specific activities (education, negotiations, e-government, or collaboration), while their user engagement metrics are monitored and changes to objects and services are recommended by the system. Also, limited access is provided to the user change management workspace 202, the user current management workspace 200, and the user data collection workspace 206.

Figure 10:
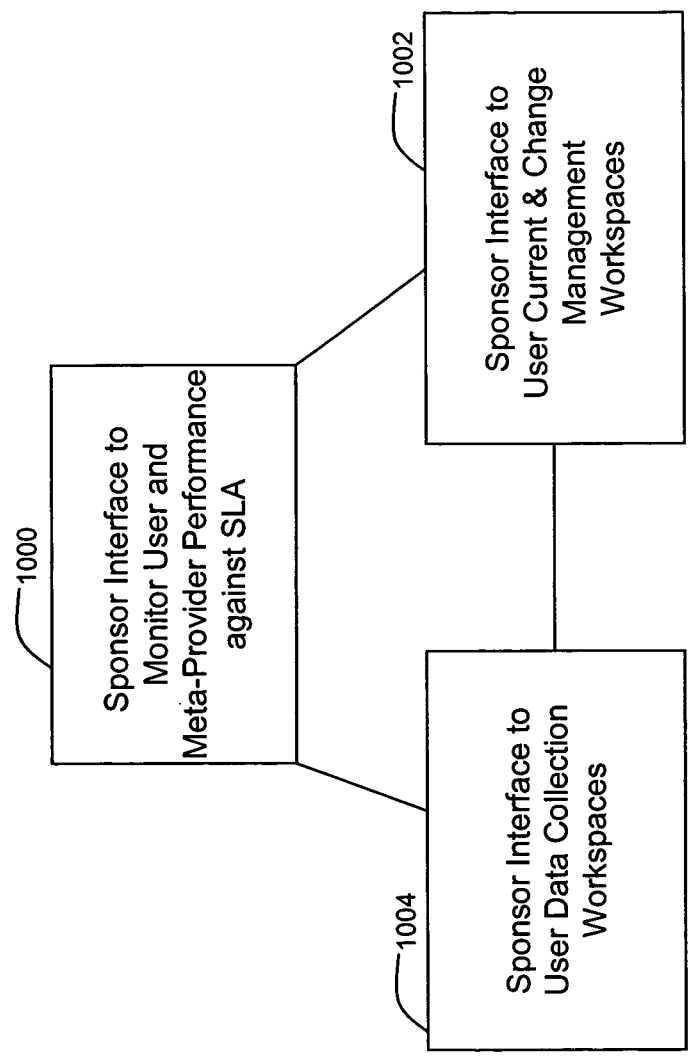
FIG. 10 is a flowchart showing example interfaces for a sponsor's interaction with an example system through various graphical interfaces.

FIG. 10 shows example interfaces for a sponsor's interaction with an example system through various graphical interfaces. In this example, there is a sponsor interface to monitor user and meta-provider performance against the SLA 1000, a sponsor interface to user current and change management workspaces 1002, and a sponsor interface to user data collection workspaces 1004.

Figure 11:
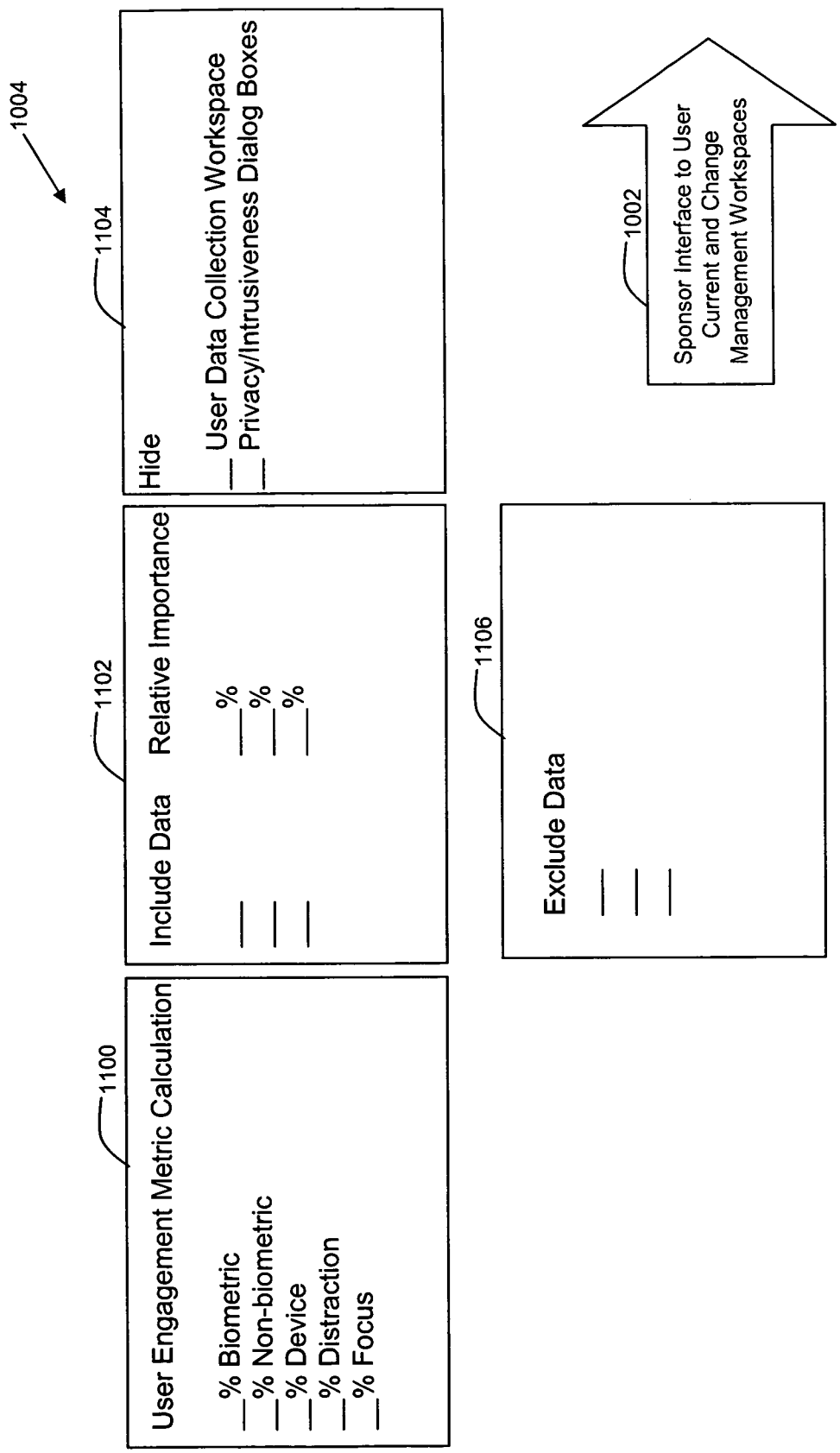
FIG. 11 is a diagram illustrating an iconic graphical user interface for a sponsor's interface to a data collection workspace.

FIG. 11 illustrates an iconic graphical user interface for the sponsor's interface to a data collection workspace 1004. There are areas for user engagement metric calculation 1100, selection of data to include and associated relative importance 1102, hide selection 1104, and exclude data selection 1106. Access is provided to the sponsor interface to user current and change management workspace 1002.

Figure 12:
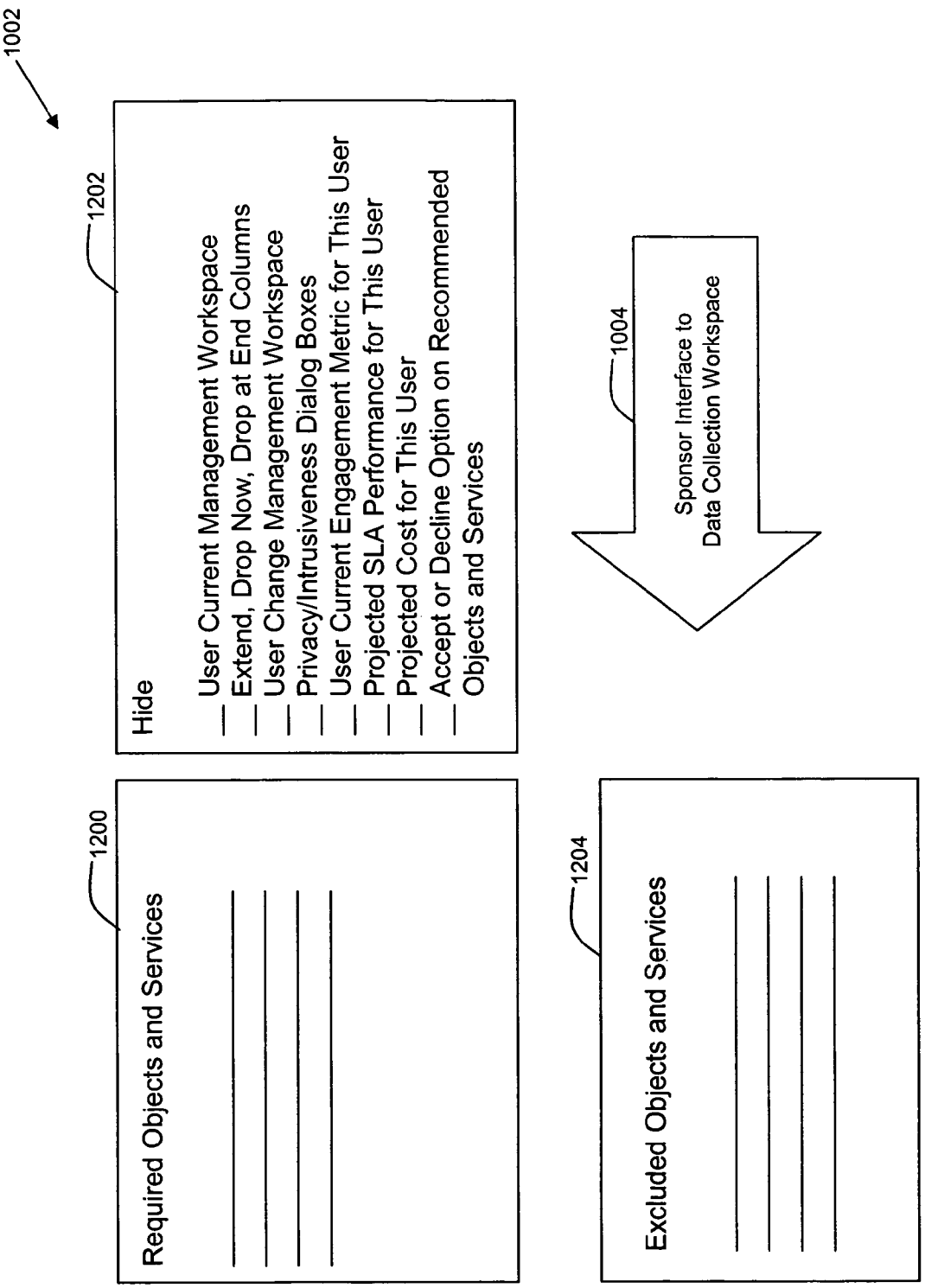
FIG. 12 is a diagram illustrating an iconic graphical user interface for a sponsor's interface to user current and change management workspaces.

FIG. 12 illustrates an iconic graphical user interface for a sponsor's interface to user current and change management workspaces 1002. There are areas for required objects and services 1200, hide selection 1202, excluded objects and services 1204, and access to the sponsor interface to the data collection workspace 1004. Depending on the domain in which the invention is embodied, the sponsor (for example, a corporation with hourly sales workers being provided with updated product education) may want to enforce or prohibit collection of certain types of biometric, non-biometric, system, distraction and focus data and specify the relative weighting to be used in determining the user engagement metric. The sponsor may make collection and use of certain data a condition of employment and prohibit the user from rejecting any data collection or recommended object or service changes based on privacy or intrusiveness concerns. The workspaces shown in FIGS. 11 and 12 enable the sponsor to modify the options available to the user on the user workspaces or even prevent them from being shown to the user. There are other domains, for example, government, in which embodiments of the invention would not allow the sponsor (a government entity, such as a municipality) to collect data without the explicit permission of citizens. The invention provides for embodiments in many situations.

Figure 13:
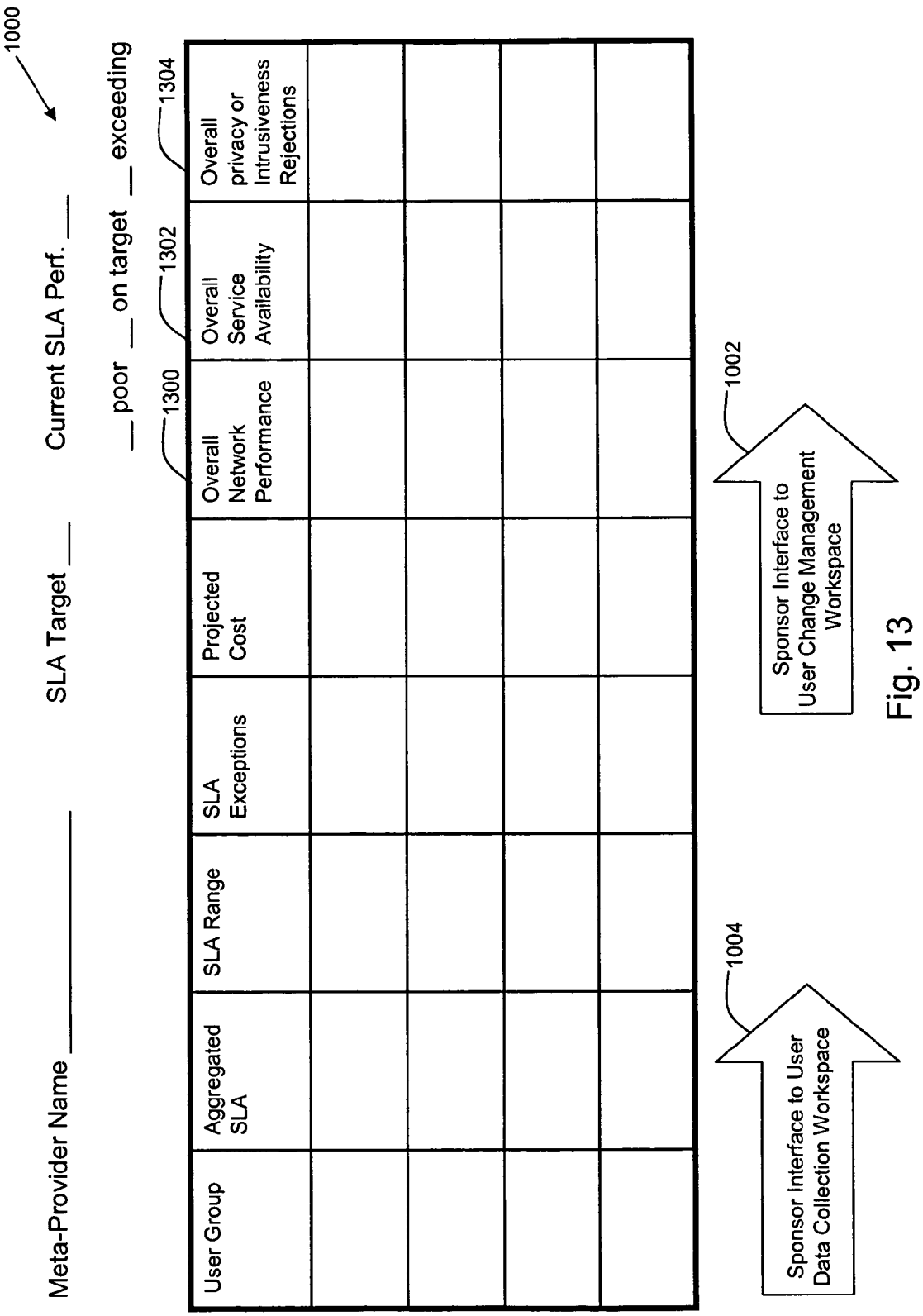
FIG. 13 is a diagram illustrating a sponsor interface to monitor user and meta-provider performance against a service level agreement (SLA)

FIG. 13 illustrates a sponsor interface to a monitor user and meta-provider performance against a service level agreement (SLA) 1000. Sponsors will find meta-providers through online marketplaces as discussed with reference to FIG. 1, and then sign service level agreements (SLAs) with them whereby each meta-provider agrees to provide objects and services, or to engage providers to do so, so that users maintain a specified aggregate level of user engagement during the duration of the service delivery. The interface 1000 illustrated on FIG. 13 enables the sponsor to monitor the performance of each meta-provider against their service level agreement, to note exceptions and cost overruns, and to monitor other aspects of service delivery relevant to user satisfaction, including overall network performance 1300, overall service availability 1302 and overall privacy and intrusiveness rejections 1304 by users of offered objects and services, if the users are permitted by the sponsor to reject such offered objects or services. The interface 1000 illustrated in FIG. 13 provides the data which enables a sponsor to choose a meta-provider who is more expensive than a competitor, but is superior on these other measures, even if both achieve their contracted user engagement metric.

While problems users encounter in network performance, service availability and frequent rejections of offered changes in objects and services will most likely be reflected in lower user engagement metrics for the users served by the meta-provider, these problems may be important to a sponsor if general user dissatisfaction with the service, even if user engagement metric targets in the service level agreement are achieved, may cause the users to find another sponsor in the future. For example, customers of private test preparation and certification service sponsors, such as those who prepare students to pass the bar exam, expect an overall quality of service from the meta-providers engaged by the sponsor.

Figure 14:
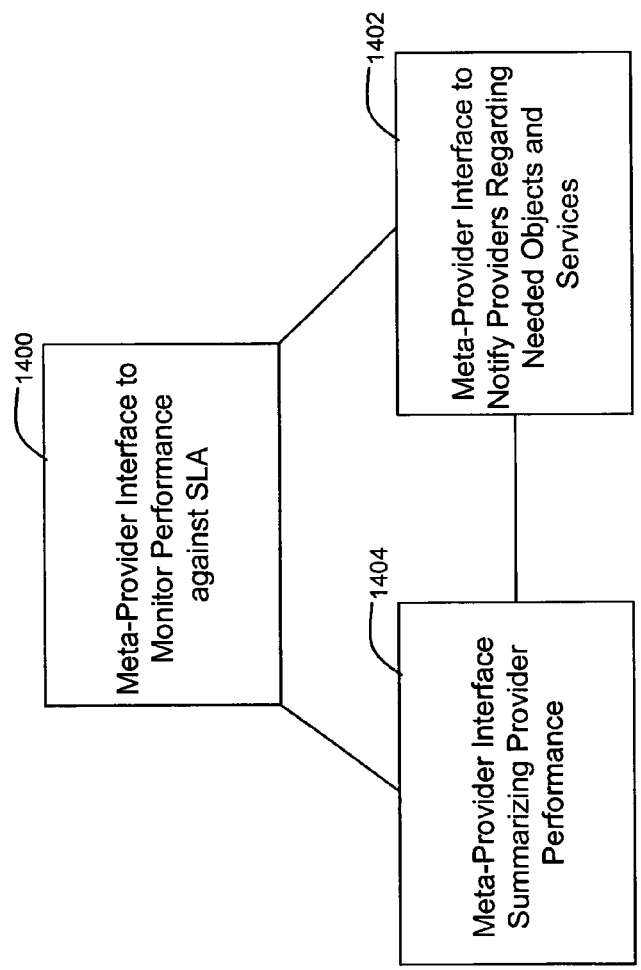
FIG. 14 is a flowchart showing interfaces for a meta-provider's interaction with an example system through various graphical interfaces.

FIG. 14 shows example interfaces for a meta-provider's interaction with an example system through various graphical interfaces. In this example, there is a meta-provider interface to monitor performance against the SLA 1400, a meta-provider interface to notify providers regarding needed objects and services 1402, and a meta-provider interface summarizing provider performance 1404.

FIG. 15 illustrates the meta-provider interface to monitor performance against a service level agreement (SLA) 1400. This example interface 1400 is similar to that in FIG. 13, which is used by sponsors, with the exception of the last column 1500 which lists for the meta-provider the names of the provider(s) with whom they have contracted to provide the specific objects and services needed for the meta-provider to achieve the terms of the SLA regarding aggregated user engagement metric.

FIG. 16 illustrates the meta-provider interface to notify providers regarding needed objects and services 1402. This example interface 1402 shows the details of the objects and services requested of a specific provider by the meta-provider, and the degree to which the provider was able to meet the requests. In cases where the provider was not able to meet the request (for example, due to capacity limitations or network performance problems), that reason is noted.

FIG. 17 illustrates the meta-provider interface summarizing provider performance 1404. This example interface 1404 enables the meta-provider to see, on one interface, a summary of the performance of all providers with whom the meta-provider has engaged to fulfill the SLA on user engagement metric with a specific sponsor for a specific user group. It summarizes the performance of each provider 1700 in terms of the user group served 1702, the objects and services provided 1704, their cost 1706, and the performance of each provider in terms of network performance 1708, service availability 1710, and rejections by users of offered objects and services 1712. This interface enables the meta-provider to compare the performance of different providers for the same user group and to identity provider(s) whose performance may be responsible for any failures of the meta-provider to meet aggregate user engagement metric agreed upon with the sponsor in the SLA.

Figure 18:
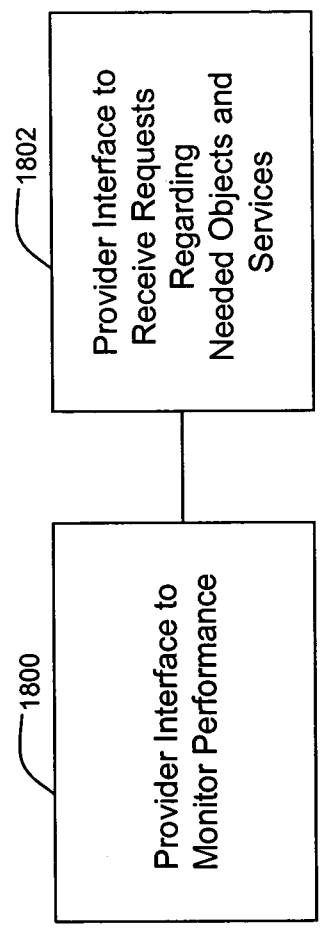
FIG. 18 is a flowchart showing interfaces for a provider's interaction with an example system through various graphical interfaces.

FIG. 18 shows interfaces for a provider's interaction with an example system through various graphical interfaces. In this example, there is a provider interface to monitor performance 1800 and a provider interface to receive requests regarding needed objects and services 1802. In the example embodiments illustrated in FIGS. 18-20, the SLA for an aggregated user engagement metric is between the sponsor and the meta-provider, with the providers engaged by the meta-provider offering specific objects and services in response to requests from the meta-provider. In the example embodiments illustrated in FIGS. 18-20, the individual providers do not have access to the user engagement metric data available to meta-providers as in FIG. 15, but function more in the role of traditional providers of objects and services in an electronic delivery environment, where the identification of the needed objects and services, based on changes in user engagement metrics, is done by the meta-providers and communicated to the individual providers. One skilled in the art could imagine an embodiment where each individual provider has access to user engagement metrics and takes a more active role in identifying the specific needed objects and services and changes thereto.

FIG. 19 illustrates the provider interface to receive requests regarding needed objects and services 1802. This example interface 1802 enables each provider to determine the status of object and service requests from the meta-provider with which they have contracted and to take action. This same data, in summary form, is provided to the meta-provider. This example interface 1802 also enables providers to identify frequently rejected objects and services in order to consider providing alternatives.

FIG. 20 illustrates the provider interface to monitor performance 1800. This example interface 1800 enables the provider to see, on a user group basis, the performance of the provider in terms of cost 2000, network performance 2002, service availability 2004 and privacy and intrusiveness rejections 2006 to identify and remediate any problems. This same data, in summary form, is provided to the meta-provider.

One skilled in the art knows that the interfaces shown in FIGS. 1-20 are implementable in many ways, such as by a voice user interface.

The present invention may be applied in many domains, such as the retail education domain, the government domain, the college education domain, the negotiations domain, and other domains.

With respect to the retail education domain, the user is a retail sales clerk. In this embodiment the sponsor (for example, a retail store chain's management) may elect to use the functionality provided by the interface on FIG. 11 (the sponsor interface to user data collection workspace 1004) to require the collection of all five types of measures shown on FIG. 3 (the user data collection workspace 206) with particular emphasis on distraction measures. The sponsor in this embodiment may elect to make visible to the user only the distraction measures, with the intention of reinforcing the importance of on task behaviors, and hide the Privacy/Intrusiveness Dialog boxes so that the retail sales clerk cannot object to the collection of any types of data, making this a condition of employment. By using the functionality provided by the interface on FIG. 12 (the sponsor's interface to user current and change management workspaces 1002) the retail store chain's management can hide the extend, drop now and drop at end options on FIG. 5 (the user current management workspace 200) or hide the workspace completely. By using the functionality provided by the interface on FIG. 12 (the sponsor's interface to user current and change management workspaces 1002) the retail store chain's management can require that the meta-provider include, or specifically exclude, certain objects and services from being recommended to the retail sales clerk for reasons of cost or another reason. The retail store chain's management may choose to hide the privacy/intrusiveness dialog boxes 600, 800 on FIGS. 6 and 8 presuming that the retail sales clerk will not be permitted to refuse any object or service needed to maintain user engagement.

With respect to the government domain, the user is a citizen. In this first embodiment the sponsor is a government municipality and the event being monitored for user engagement metric is a virtual town hall meeting moderated by the mayor and delivered to citizens, individually or in groups in their homes or public spaces, via the interface shown in FIG. 9 (the user electronic workspace 204). In this first embodiment in the government domain, the sponsoring government municipality, in response to citizen objections against the collection of the types of data included in FIG. 3 (the user data collection workspace 206), has agreed to not collect any data and to hide from users the interfaces shown on FIG. 3 (the user data collection workspace 206), FIG. 5 (the user current management workspace 200) and FIG. 7 (the user change management workspace 202). The sponsor uses FIG. 11 (the sponsor's interface to a data collection workspace 1004) and FIG. 12 (the sponsor's interface to user current and change management workspaces 1002) to implement these decisions. The sponsoring government agency has agreed to provide user selectable language translation services via the interface shown in FIG. 9 (the user electronic workspace 204).

In a second embodiment in the government domain, the government has additionally offered each citizen the option to be monitored for only the biometric measures listed in FIG. 3 (the user data collection workspace 206) so that impact, and effectiveness, of selected language translation services on user engagement metrics can be determined. The government's intention is to make use of the same data for monitoring the health of homebound citizens so as to alert medical authorities if changes in the biometric data indicate a health emergency for that citizen. The government assures those citizens who agree to the biometric monitoring that their individual data will only be available to emergency health response services and that the meta-provider of the language translation services will only see aggregated user engagement data as shown on FIG. 15 (the meta-provider interface to monitor performance against an SLA 1400). If the meta-provider has engaged, via the online marketplace noted in FIG. 1, a provider for the language translation services, only the requests from individual citizens for this service, and not their user engagement data, will be visible on FIG. 19 (the provider interface to receive requests regarding needed objects and services 1802).

With respect to the college education domain, the user is a non-tenured college teacher who has agreed to coaching on improving the effectiveness of their teaching methods in order to avoid being fired based on consistent negative student feedback on teaching quality as opposed to positive student feedback on subject knowledge. The sponsor is the university employing the teacher. The university has engaged a meta-provider who has committed via an SLA to maintain or exceed a minimum user engagement metric for each of the poorly performing teachers identified by the university who agree to the monitoring, on the assumption that it is ultimately cheaper to help a teacher maintain their user engagement than to implement interventions for all of their students who are evidencing poor user engagement. Each teacher has agreed to allow all the types of data on FIG. 3 (the user data collection workspace 206) to be collected and to have them weighted equally. The sponsor implements this decision via the interface shown in FIG. 11 (the sponsor's interface to a data collection workspace 1004), but agrees to allow teachers to reject current (FIG. 6) and recommended (FIG. 8) objects or services for reasons of privacy or intrusiveness. The meta-provider, via an online marketplace noted in FIG. 1, engages one or more providers who will be responsible for providing technical glossaries, text summarization services, jokes and animators in response to specific requests from the meta-provider who monitors each teacher's user engagement metric and transmits requests to providers via the interface shown in FIG. 16 (the meta-provider interface to notify providers regarding needed objects and services 1402). These requests are received by each provider in the interface shown on FIG. 19 (the provider interface to receive requests regarding needed objects and services 1802).

With respect to the negotiations domain, in one embodiment the user is an employee of a corporation who is undergoing training to improve his/her negotiating skills so as to decrease the time they need to build rapport with their negotiating counterparts from business partners. The sponsor is the employee's corporation who has engaged, via an online marketplace noted in FIG. 1, a meta-provider who has committed to help the corporation's negotiators improve their user engagement metrics when responding to a corporate developed negotiations simulator which models the cognitive and personal styles of various negotiators. In this embodiment the meta-provider also functions as the provider and monitors the user data indicated on FIG. 3 (the user data collection workspace 206) and recommends, via the interface noted on FIG. 7 (the user change management workspace 202), services such as biofeedback data and posture and voice suggestions via text chat or audio via a headset to enable the negotiating skills trainee to improve his/her user engagement metric as the negotiations simulator models changes in the simulated negotiations partner's cognitive and affective responses. In this embodiment the corporation is pleased with the results of the services offered to their negotiator during training and offers to use their meta-provider to provide objects and services to both parties during actual negotiations with the goal of speeding up the negotiations.

It is to be understood that the above description is intended to be illustrative and not restrictive. Many other embodiments will be apparent to those of skill in the art upon reviewing the above description, such as adaptations of the present disclosure to other markets, such as providers and meta-providers (aggregators) of corporate and university e-learning content, services and infrastructure, providers of corporate and university classroom training, providers of certification examination preparation services, providers of presentation skills coaching services, providers of teacher training and certification programs, providers of collaboration, negotiation and trading environments and infrastructures, and the like. The present disclosure applies to many various types of products, such as systems that provide an e-learning infrastructure including services and content, performance-based systems and simulators for coaching learners, presenters, negotiators or traders, systems for providing collaborative environments, such as software for enabling web conferences, and the like. Various designs using hardware, software, and firmware are contemplated by the present disclosure, even though some minor elements would need to change to better support the environments common to such systems and methods. Therefore, the scope of the present disclosure should be determined with reference to the appended claims, along with the full scope of equivalents to which such claims are entitled.

What is claimed is:

1. A self-service system for education for providers, comprising:
   a learning environment which uses biometric, non-biometric and system data to inform the selection and execution of support services which maximize user engagement metrics and enables providers to negotiate service level agreements based on said metrics, said learning environment selected from the group consisting of a user, an educational object, a support service, an individual, an aggregated user engagement metric, a performance against a service level agreement, a cost incurred, a charge assessed by a stakeholder, a charge against said stakeholder and any combination thereof, said learning environment, further comprising a plurality of interfaces for a plurality of said stakeholders, wherein said stakeholders comprise said user and a sponsor that use a first interface and a second interface of said plurality of interfaces, respectively;
   at least one first metric for measuring a level of engagement of said user with said learning environment via said first interface that is collected in a user workspace;
   wherein said sponsor using said second interface accesses said first metric in said user workspace and determines recommended object and/or service changes based on said first metric so as to provide a customizable service configured to maximize said user engagement with said learning environment;
   wherein said user using one of said interfaces other than said second interface accepts said recommended object and/or service changes;
   a list of a plurality of default objects or services presented on said first interface; wherein said user accepts or declines at least one of said default objects or services; wherein said declined object or service is eliminated from future presentations of said list for said user in said learning environment; and
   a further second metric for measuring an effectiveness of said customizable service.

2. The system according to claim 1, wherein other stakeholders of said plurality of stakeholders are selected from the group consisting of: a meta-provider, a provider, and any combination thereof.

3. The system according to claim 2, wherein said user is selected from the group consisting of: a student, a teacher, a group of students, a group of teachers, an individual employee, a department, a company, a citizen, a geopolitical group, and any combination thereof.

4. The system according to claim 2, wherein said provider offers said customizable service to a meta-provider or directly to said user.

5. The system according to claim 1, wherein said user has access to said customizable service via said first interface and said user workspace.

6. The system according to claim 5, wherein said meta-provider aggregates said customizable service of at least one provider for delivery to at least one user.

7. The system according to claim 1, wherein said customizable service is selected from the group consisting of: a playback of a live presentation, a computer-based training program, an animation, a simulation, a game, a language translator, and any combination thereof.

8. The system according to claim 2, wherein said sponsor authorizes delivery of at least one educational object or at least one support service and changes by a provider, on behalf of at least one user, wherein said sponsor is selected from the group consisting of: a corporate buyer, a university, a governmental entity, and any combination thereof.

9. The system according to claim 1, wherein said stakeholders are physically co-located.

10. The system according to claim 1, wherein said stakeholders are accessible via at least one network-based technology.

11. The system according to claim 10, wherein said network-based technology is at least one selected from the group consisting of: web conferencing, video conferencing, teleconferencing, text chat, and a virtual collaboration technology.

12. The system according to claim 1, wherein said plurality of interfaces includes at least one interface for providing at least one educational object to said user.

13. The system according to claim 12, wherein said education object is configurable to maximize said user engagement.

14. The system according to claim 13, wherein said configuration is performed consistent with user privacy preferences.

15. The system according to claim 1, wherein said plurality of interfaces includes at least one interface for providing at least one support service to said user.

16. The system according to claim 15, wherein said support service is configurable to maximize said user engagement.

17. The system according to claim 16, wherein said configuration is performed consistent with user privacy preferences.

18. The system according to claim 1, wherein said metric is based on data selected from the group consisting of: biometric, non-biometric, device, distraction, and focus.

19. The system according to claim 18, wherein said data is collected consistent with user privacy preferences.

20. The system according to claim 1, wherein said metric is measured for a category selected from the group consisting of: a group of users in a specific course, a department, a job classification, a specific providers, a meta-provider, and any combination thereof.

21. The system according to claim 2, further comprising at least one service level agreement between any combination of stakeholders, said service level agreement being based on said metric.

22. The system according to claim 21, further comprising: a plurality of electronic connections between information technology infrastructures of any combination of said stakeholders and an online marketplace to facilitate negotiations for said service level agreement.

23. The system according to claim 22, wherein said electronic connections between information technology infrastructures of any combinations of stakeholders enables said user access to said learning environment of a sponsor.

24. The system according to claim 23, wherein said user access is provided by a mechanism selected from the group consisting of: said sponsor's intranet, said sponsor's portal, and said user's electronic workplace.

25. The system according to claim 21, wherein said service level agreement results from negotiations based on at least one auction.

26. The system according to claim 25, wherein said auction is conducted in whole or in part by at least one software agent.

27. The system according to claim 1, further comprising a delivery platform having a portal through which different workspaces and interfaces of the self service system can be displayed and operated on one or more user and provider devices.

28. The system according to claim 27, wherein said user and provider devices are selected from the group consisting of: a PDA, a cellular phone, a tablet computer, a laptop computer, a desktop computer, and a workstation.

29. The system according to claim 27, wherein said portal provides a consistent and coherent user experience.

30. A method of education that operates in a computer system that comprises a plurality of computers connected to a network, said method comprising:
providing through a portal of said system a learning environment which uses biometric, non-biometric and system data to inform the selection and execution of support services which maximize user engagement metrics and enables providers to negotiate service level agreements based on said metrics, said learning environment selected from the group consisting of a user, an educational object, a support service, an individual, an aggregated user engagement metric, a performance against a service level agreement, a cost incurred, a charge assessed by a stakeholder, a charge against stakeholder and any combination thereof, said learning environment, further comprising a plurality of interfaces for a plurality of said stakeholders, wherein said stakeholders comprise said user and a sponsor that use a first interface and a second interface of said plurality of interfaces, respectively;
measuring at least one first metric that indicates a level of user engagement with said learning environment, using at least said first interface and a first one of said computers;
collecting said first metric in a user workspace;
providing said sponsor access to said metric in said user workspace via said second interface and a second one of said computers, wherein said sponsor determines recommended object and/or service changes based on said metric so as to provide a customizable service configured to maximize said user engagement with said learning environment;
wherein said user using one of said interfaces other than said second interface accepts said recommended object and/or service changes, which, when implemented, can maximize said user engagement with said learning environment;
presenting a list of a plurality of default objects or services on said first interface; wherein said user accepts or declines at least one of said default objects or services;
eliminating said declined object or service from future presentations of said list for said user in said learning environment; and
measuring at least a further second metric that indicates an effectiveness of said customizable service.

31. The method according to claim 30, further comprising: monitoring said learning environment; and
collecting any changes in status data associated with said learning environment.

32. The method according to claim 31, wherein said learning environment includes at least one item selected from the group consisting of: a user, an educational object, a support service, an individual, an aggregated user engagement metric, a performance against a service level agreement, a cost incurred, a charge assessed by a stakeholder, a charge against said stakeholders, and any combination thereof.

33. The method according to claim 32, further comprising a plurality of said items and providing at least one relationship between at least two of said items for stakeholder analysis and decision making.

34. The method according to claim 32, further comprising: recommending a change to at least one said educational object for a group of users who share a learning environment.

35. The method according to claim 34, wherein said educational object is selected from the group consisting of: a text, a multimedia presentation, a training session, a training manual, an audio clip, a video clip, a web site, a corporate web site, a government web site, a course, a qualification course, a course in a degree program, and any combination thereof.

36. The method according to claim 34, wherein said change to said educational object is selected from the group consisting of: a volume, a color, a contrast, a tone, a voice, a teaching style, a subject matter, a quiz, a question, a work flow, a pace, an educational complexity, an educational sophistication, a level of detail, a level of animation, an insertion of a break, a sensory stimulant, and any combination thereof.

37. The method according to claim 36, wherein said sensory stimulant is selected from the group consisting of: a joke, a scream, a burst of air, a mouse vibration, a keyboard vibration, an aroma, a music selection, a timbre, an amount of bass, an amount of treble, a blinking, a gender of a live teacher, an ethnicity of a live teacher, a vocal accent of a live teacher, an appearance of a live teacher, a gender of a simulated teacher, an ethnicity of a simulated teacher, a vocal accent of a simulated teacher, an appearance of a simulated teacher, and any combination thereof.

38. The method according to claim 32, further comprising: recommending a change to at least one said support service for a group of users who share a learning environment.

39. The method according to claim 38, wherein said at least one support service is selected from the group consisting of: an information transmission, a text summarization, a language translation, a technical glossary, a capture and replay of live presentations, and any combination thereof.

40. The method according to claim 38, wherein said change to said at least one support service is selected from the group consisting of: adding one of said support services, removing one of said support services, modifying one of said support services, changing a start of one of said support services, changing a stop time of one of said support services, changing an intensity of one of said support services, changing a duration of one of said support services, and any combination thereof.

41. The method according to claim 30, further comprising: basing teacher performance ratings in whole or in part on performance against at least one service level agreement.

42. The method according to claim 30, further comprising: basing teacher compensation in whole or in part on performance against at least one service level agreement.

43. The method according to claim 30, wherein said at least one metric is based on data selected from the group consisting of: biometric data, non-biometric data, device data, distraction data, and focus data.

44. The method according to claim 43, wherein said biometric data includes behavior, speech and gestures.

45. The method according to claim 43, wherein said biometric data is selected from the group consisting of: heart rate, breathing rate, body temperature, brain waves, blood pressure, blood composition, disease state, pupil dilation amount, iris size, eye gaze and focus, eye movements, voice quality assessment in a speech recognition system, facial expression, degree of movement, repetition of movement, an indicator of arousal, an indicator of emotion, a shift in body position, a fidgeting movement, and any combination thereof.

46. The method according to claim 43, wherein said non-biometric data is selected from the group consisting of: degree of multitasking, efficiency of task performance, number of non-learning task related windows open, changes in grammar, spelling proficiency, and any combination thereof.

47. The method according to claim 43, wherein said device data is selected from the group consisting of: processor speed, memory capacity, system load status, network bandwidth, network transmission speed, overall response time of tools for a user, and any combination thereof.

48. The method according to claim 43, wherein said focus data is selected from the group consisting of: a time spent on a web page related to a presentation, a cursor movement on a presentation, a selection of an input on a presentation, a scroll time on a presentation, and any combination thereof.

49. The method according to claim 43, wherein said distraction data is selected from the group consisting of: a time on a web page that is not related to a presentation, an exchange of email with another student, an instant message with another student, a gaze out a window, a decreased typing speed, a lack of mouse motion, talking on a phone, talking to another, an incorrect response, a slow response, an inappropriate response, and any combination thereof.

50. A computer readable medium having executable instructions stored thereon to perform a method of education, said method comprising:

providing a learning environment which uses biometric, non-biometric and system data to inform the selection and execution of support services which maximize user engagement metrics and enables providers to negotiate service level agreements based on said metrics, said learning environment selected from the group consisting of a user, an educational object, a support service, an individual, an aggregated user engagement metric, a performance against a service level agreement, a cost incurred, a charge assessed by a stakeholder, a charge against said stakeholder and any combination thereof, said learning environment, further comprising a plurality of interfaces for a plurality of said stakeholders, wherein said stakeholders comprise said user and a sponsor that use a first interface and a second interface of said plurality of interfaces, respectively;

measuring at least one first metric that indicates a level of user engagement with said learning environment via said first interface and a first one of said computers;

collecting said metric in a user workspace;

providing said sponsor access to said first metric in said user workspace via said second interface and a second one of said computers, wherein said sponsor determines recommended object and/or service changes based on said metric so as to provide a customizable service configured to maximize said user engagement with said learning environment;

wherein said user using one of said interfaces other than said second interface accepts said recommended object and/or service changes;

presenting a list of a plurality of default objects or services on said first interface; wherein said user accepts or declines at least one of said default objects or services; and eliminating said declined object or service from future presentations of said list for said user in said learning environment;

and measuring at least a further second metric that indicates an effectiveness of said customizable service.

51. The computer readable medium according to claim 50, wherein one of said interfaces receives a selection of said metric from categories, wherein said categories are selected from the group consisting of: biometric, non-biometric, user device, focus and distraction data to be used in determining said at least one metric, and further wherein said plurality of interfaces receives a relative importance of each selected category.

52. The computer readable medium according to claim 50, further comprising:
restricting, by an organization, a user's choices of categories selected from the group consisting of: providers and meta-providers, specific providers and meta-providers.

53. The readable medium according to claim 52, wherein said restricting is performed regardless of the provider.

54. The readable medium according to claim 52, wherein said restricting is performed based on a criteria selected from the group consisting of: cost, privacy, intrusiveness, and any combination thereof.

55. The computer readable medium according to claim 50, further comprising:
restricting, by an organization, educational object or support service choices and changes.

56. The computer readable medium according to claim 55, wherein said restricting is performed regardless of the provider.

57. The computer readable medium according to claim 55, wherein said restricting is performed based on a criteria selected from the group consisting of: cost, privacy, intrusiveness, and any combination thereof.

58. The computer readable medium according to claim 50, wherein said learning environment has a domain selected from the group consisting of: learning, training, education, teacher preparation, teacher certification, teacher presentation skills coaching, and any combination thereof.

59. The computer readable medium according to claim 50, wherein said learning environment is in a form of collaboration with at least one colleague.

60. The computer readable medium according to claim 59, wherein a purpose of said collaboration is selected from the group consisting of: learning, business strategy, business tactics, business use, personal use, negotiation, trading, and any combination thereof.

61. The system according to claim 1, wherein said further metric measures an extent to which current or recommended objects or services are dropped or rejected by said user.

62. The method according to claim 30, wherein said further metric measures an extent to which current or recommended objects or services are dropped or rejected by said user.

63. The computer readable medium according to claim 50, wherein said further metric measures an extent to which current or recommended objects or services are dropped or rejected by said user.

* * * * *